(12) United States Patent
Wang

(10) Patent No.: US 11,063,627 B2
(45) Date of Patent: Jul. 13, 2021

(54) STORAGE DEVICE FOR PORTABLE DEVICE USED IN LUGGAGE

(71) Applicant: SHANGHAI NEWEST LUGGAGE CO LTD, Shanghai (CN)

(72) Inventor: Xiangjun Wang, Shanghai (CN)

(73) Assignee: SHANGHAI NEWEST LUGGAGE CO LTD, Shanghai (CN)

(*) Notice: Subject to any disclaimer, the term of this patent is extended or adjusted under 35 U.S.C. 154(b) by 110 days.

(21) Appl. No.: 16/705,234

(22) Filed: Dec. 6, 2019

(65) Prior Publication Data

US 2020/0336165 A1 Oct. 22, 2020

(30) Foreign Application Priority Data

Apr. 20, 2019 (CN) .......................... 201920541754.6

(51) Int. Cl.
*H04B 1/3888* (2015.01)
*A45F 5/00* (2006.01)
*H02J 7/00* (2006.01)

(52) U.S. Cl.
CPC ............. *H04B 1/3888* (2013.01); *A45F 5/00* (2013.01); *A45F 2200/0516* (2013.01); *H02J 7/0044* (2013.01)

(58) Field of Classification Search
CPC . A45C 2011/002; A45C 13/28; A45C 13/025; A45C 13/02; H04B 1/3888; H02J 7/0044; A45F 2200/0516
USPC ........................................................ 190/102
See application file for complete search history.

(56) References Cited

U.S. PATENT DOCUMENTS

| | | | | |
|---|---|---|---|---|
| 5,124,854 A * | 6/1992 | Lyota | ............... | G11B 15/67584 360/96.61 |
| 5,886,848 A * | 3/1999 | Ahn | ............... | G11B 15/67547 360/96.51 |
| 5,917,675 A * | 6/1999 | Yang | ............... | G11B 33/027 360/96.51 |
| 5,996,866 A * | 12/1999 | Susko | ............... | B60R 11/0241 224/281 |
| 6,565,137 B1 * | 5/2003 | Snook | ............... | B60N 3/002 108/147 |
| 10,130,152 B2 * | 11/2018 | Bhatnagar | ............... | A45C 5/14 |
| 10,780,840 B1 * | 9/2020 | Richardson | ............... | B60R 11/0241 |
| 10,793,082 B2 * | 10/2020 | Harris | ............... | B60R 11/02 |
| 10,868,434 B2 * | 12/2020 | Goldner | ............... | A45C 15/00 |
| 11,006,715 B2 * | 5/2021 | Yang | ............... | A45C 15/00 |

(Continued)

*Primary Examiner* — Adam J Waggenspack
(74) *Attorney, Agent, or Firm* — JCIP Global Inc.

(57) ABSTRACT

A storage device adapted for portable device and suitable to be installed in luggage includes an inner housing, an outer housing and a base. The inner housing includes two parallel vertical side walls and a transverse base wall connected to bottoms of the vertical side walls. The vertical side walls are provided with a baffle plate and/or a baffle bar at both front and rear sides. The outer housing has a top opening and defines a receiving cavity to receive the inner housing. The base is arranged below the transverse base wall and includes two connecting brackets and a connecting pin. The transverse base wall has two connecting legs extending away from its bottom. The connecting legs each define a vertical waist-shaped hole and sleeve over the connecting pin through the vertical waist-shaped holes. Two sides of the base are connected to the receiving cavity in a slidable manner.

10 Claims, 6 Drawing Sheets

(56) References Cited

U.S. PATENT DOCUMENTS

2020/0212694 A1* 7/2020 Spyrison .............. H02J 50/90
2021/0093064 A1* 4/2021 Roosen .............. A45C 15/00

* cited by examiner

STORAGE DEVICE FOR PORTABLE DEVICE USED IN LUGGAGE

CROSS-REFERENCE TO RELATED APPLICATION

This application claims the priority benefit of China application serial no. 201920541754.6, filed on Apr. 20, 2019. The entirety of the above-mentioned patent application is hereby incorporated by reference herein and made a part of this specification.

BACKGROUND

Technical Field

The present disclosure relates to a storage device for a portable device such as a portable power bank, a smart phone or the like and, more specifically, to a storage device for portable device suitable to be installed in luggage.

Description of Related Art

With the development of smart phones in recent years, people have become more and more dependent on smart phones. For example, many people use smart phones for entertaining or working during their trips. In this case, how to hold and charge smart phones in a convenient way has become a problem for those travelling. Obviously, luggage is a best tool for use in solving the problem because it is always with the travelers during their trips. Therefore, novel luggage or a device that can solve the above problem is desired.

SUMMARY

An aspect of the present disclosure is to overcome the defects found in the prior art, and to provide a storage device for a portable power bank, which is used in luggage and is convenient for a user to take the portable power bank from the luggage during a trip, and has an advantage of low cost in manufacture and maintenance.

Embodiments of the present disclosure provide a storage device adapted for portable device and suitable to be installed in luggage. The storage device comprising an inner housing, an outer housing and a base. The inner housing has a top defining an opening and comprises two vertical side walls and a transverse base wall. The vertical side walls are arranged in parallel with each other and provided with a baffle plate and/or a baffle bar at both front and rear sides. The transverse base wall is connected to bottom ends of the two vertical side walls, and the transverse base wall is provided with two connecting legs at a bottom thereof and extending away from the transverse base wall. Each of the connecting legs defines a vertical waist-shaped hole. The outer housing has a top opening, and defines internally a receiving cavity configured to receive the inner housing. The base is arranged below the transverse base wall. The base comprises two connecting brackets and a connecting pin disposed between the connecting brackets. The connecting legs sleeve over the connecting pin through the vertical waist-shaped holes, and two sides of the base are connected to the receiving cavity in a slidable manner.

Preferably, the base further comprises a spring button, and the bottom of the transverse base wall is further provided with a trigger configured to trigger the spring button, a limiting hole is provided at each side of the receiving cavity in proximity to the top opening of the outer housing, and the spring button comprises a position limiting member which matches the limiting hole.

Preferably, the position limiting member is a sliding bar, and the spring button further comprises a rod, a spring, and a seat configured to hold the rod, the spring and the sliding bar. The rod is moveable upward and downward along the seat, the rod has a lower end having a first inclined surface, the sliding bar is arranged transversely below the rod and has a second inclined surface matching the first inclined surface, the sliding bar has an end transversely protruding from the seat and from the base and matching the limiting hole, and a further end connected to the spring which is limited transversely between the sliding bar and the seat.

Preferably, the rod has an upper end protruding from the seat and is able to be brought into contact with the trigger.

Preferably, guide rails are provided at two sides of the receiving cavity, the two sides of the base are provided with sliding blocks matching the guide rails to facilitate sliding connection between the two sides of the base and the receiving cavity.

Preferably, at least a heat dissipation hole is provided on at least one side wall of the outer housing.

Preferably, a plurality of heat dissipation holes are provided on each of a front rear side wall and a rear side wall of the outer housing.

Preferably, the outer housing has a bottom defining an opening extending into receiving cavity and configured to allow a wire to pass therethrough.

Preferably, a fixing plate is provided around the top opening of the outer housing, and the fixing plate is configured to be fastened onto the luggage Preferably, a cover is provided at one side of the top opening of the outer housing, and the cover is pivotably connected to the fixing plate.

According to embodiments of the present disclosure, the storage device may be installed in the luggage, which is convenient for the user to put a mobile phone or a portable power bank or other portable devices into the luggage as well as take them out when people are traveling outside. Since the storage device can be directly attached to normal luggage, it is not necessary to change the structure of the draw bar assembly of the luggage, thereby saving the costs. The inner housing of the storage device is configured to accommodate most kinds of smart phones and portable power bank, and is able to be pulled out from or pushed into the receiving cavity inside the outer housing due to the sliding connection between the receiving cavity and the base. The inner housing is also able to pivot about a connecting pin connected to the connecting bracket of the base, which makes it convenient to take out or place back the portable device. The storage device is convenient and time saving in use, has a low cost in manufacture and is suitable for various kinds of luggage.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
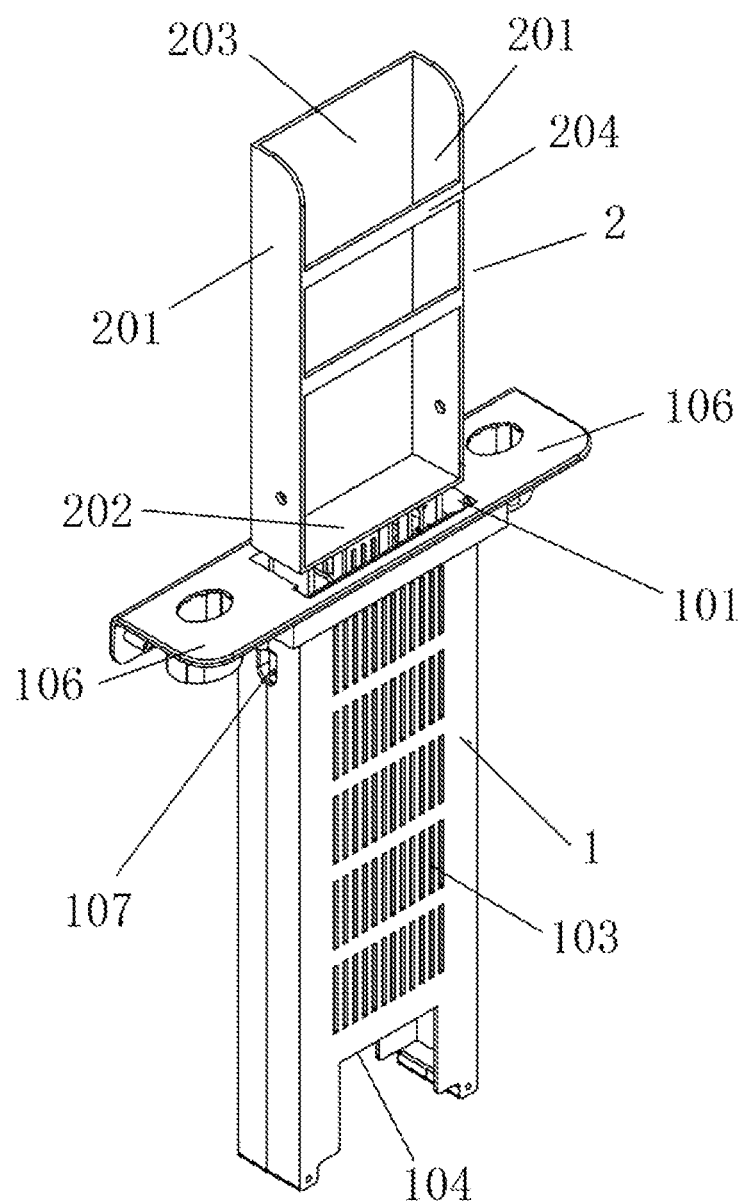
FIG. 1 is a schematic diagram showing a structure of a storage device according to an embodiment of the present disclosure when an inner housing is pulled out from an outer housing.
Figure 2:
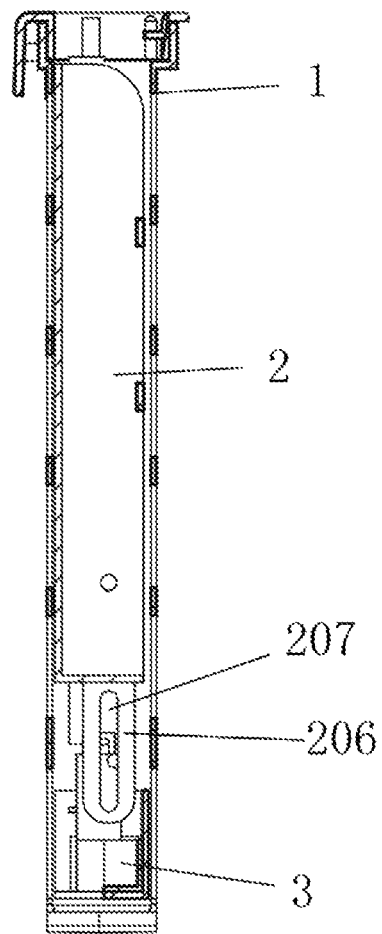
FIG. 2 is a schematic diagram showing an internal structure of the storage device according to the embodiment of the present disclosure when the inner housing received in a receiving cavity.
Figure 3:
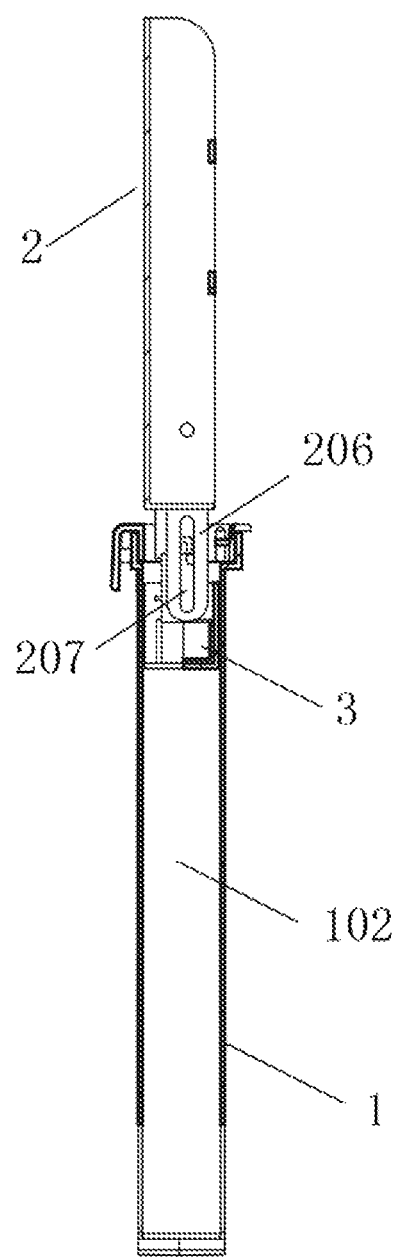
FIG. 3 is a schematic diagram showing the internal structure of the storage device according to the embodiment of the present disclosure when the inner housing is pulled out from the outer housing.

Described below are merely certain exemplary embodiments. As will be recognized by those skilled in the art, the embodiments disclosed herein may be modified in various manners without departing from the spirit or scope of the present disclosure. Accordingly, the accompanying drawings and description are to be regarded as intrinsically exemplary rather than restrictive.

As used herein, the directional and spatial terms "upper", "lower", "front", "rear", "left", "right", "vertical", "horizontal", "top", "bottom", "interior", "exterior", etc. are meant to be used with respect to the configurations shown in the figures. They are intended merely to facilitate and simplify the explanation of the disclosure and do not indicate or imply the stated components or elements have to assume, or be constructed or operated in, particular orientations. Therefore, they are not to be construed as limiting the disclosure.

In addition, the terms "first", "second", etc. are used herein only for the purpose of illustration and are not to be construed as indicating or implying relative importance or implicitly indicating the number of the stated features. Therefore, a feature described with "first", "second" or the like can explicitly or implicitly indicate the presence of one or more such features.

As used herein, unless defined or limited otherwise, the terms "attached" "coupled", "connected", "fixed", "fastened" or any variant thereof, should be construed in a broad sense to encompass any connection established between two components, whether fixedly, detachably or integrally, whether mechanically, electrically or communicatively, whether directly or via an intermediate medium, whether through internal communication or through external interaction. For those of ordinary skill in the art, the aforementioned terms can be interpreted based on their context herein.

In this specification, unless defined or limited otherwise, when a first feature is described as being "on" or "under" a second feature, it can be in direct contact with the second feature, or intervening elements may also be present. Moreover, when a first feature is described as being "over", "overlying" or "above" a second feature, it may either be situated normally or obliquely over the second feature, or it may only be located at a horizontal level higher than a horizontal level at which the second feature is located. Similarly, when a first feature is described as being "under", "underlying" or "below" a second feature, it may either be situated normally or obliquely under the second feature, or it may only be located at a horizontal level lower than a horizontal level at which the second feature is located.

The following disclosure provides many different embodiments or examples for implementing different features of the present disclosure. Specific examples of components and arrangements are described below to simplify the present disclosure. These are, of course, merely examples and are not to be limiting. In addition, the present disclosure may repeat reference numerals and/or letters in the various examples. This repetition is for simplicity and clarity and does not dictate a relationship between the various embodiments and/or configurations discussed. Further, although the present disclosure provides examples of various particular processes and materials, those of ordinary skill in the art will recognize the use of other processes and/or the use of other materials.

According to embodiments as shown in FIG. 1 to FIG. 7, the storage device of the present disclosure includes an outer housing 1, an inner housing 2 and a base 3. The inner housing 2 includes two vertical side walls 201 arranged in parallel with each other and one transverse base wall 202 connecting the two vertical side walls 201 at the bottoms thereof. The vertical side walls 201 are provided with a baffle plate and/or a baffle bar at both front and rear sides of the vertical side walls. In a preferred embodiment, a baffle plate 203 is provided at the rear side of the vertical side walls 201, and at least one baffle bar 204 is provided at the front side of the vertical side walls, in particular, two baffle bars 204 are provided. The number and arrangement of the baffle plate and the baffle bar are not limited by the embodiments of the present disclosure, and can be changed for actual needs, as long as the inner housing is able to prevent a portable device from falling out of it from the front or rear side. The vertical side walls 201, the transverse base wall 202, the baffle plate 203 and the baffle bars 204 collectively define a cavity for receiving and accommodating a portable device. An opening is defined at the top of the inner housing 2. The portable device can be inserted into the inner housing 2 through the opening.

Referring to FIG. 1 to FIG. 4, an opening 101 is defined at the top of the outer housing 1 to allow the inner housing 2 to pass through. A fixing plate 106 is provided at the opening 101 and surrounds the opening 101. Preferably, the opening 101 may be further provided with a cover. A receiving cavity 102 is defined in the outer housing 1 for receiving and accommodating the inner housing 2. Heat dissipation holes 103 are defined at front and/or rear walls of the outer housing 1. An opening 104 for wires is defined at the bottom of the outer housing 1, and extends into the receiving cavity 102. In such way, wire(s) can be connected to the portable device, in particular a portable power bank, accommodated in the receiving cavity 102 through the opening 104.

The base 3 is used to connect the inner housing 2 to the outer housing 1 in a movable manner. In a preferred embodiment, the base 3 is arranged below the transverse base wall 202 of the inner housing 2, and comprises a connecting bracket 301. Preferably, two connecting brackets 301 are provided. The base 3 further comprises a connecting pin 302 provided between the two connecting brackets 301.

Connecting legs 206 are provided at the bottom of the transverse base wall 202, and each connecting leg is defined with a vertical waist-shaped hole 207. In such way, the connecting leg 206 can sleeve over the connecting pin 302 through the vertical waist-shaped hole 207, and also can slide with respect to the connecting pin 302 and pivot about the connecting pin 302 (see FIG. 1 and FIG. 4).

The base 3 is slidable within the receiving cavity 102 of the outer housing 1. The two side walls defining the receiving cavity 102 may be used as guiding surfaces or provided with guiding members for allowing the base 3 to slide thereon. The two sides of the base 3 are provided with connecting members which can match with the guiding members and slidable with respect to the guiding members. In a preferred embodiment, guide rails are provided at the two side walls of the receiving cavity 102, and the two sides of the base 3 are provided with sliding blocks which match and connect the guide rails in a slidable manner, so that a sliding connection between the base 3 and the receiving cavity 102 can be formed through the sliding blocks and the guide rails.

Limiting holes 107 are defined on two side walls of the receiving cavity 102 to prevent the base 3 and the inner housing 2 from falling out of the outer housing 1.

Figure 4:
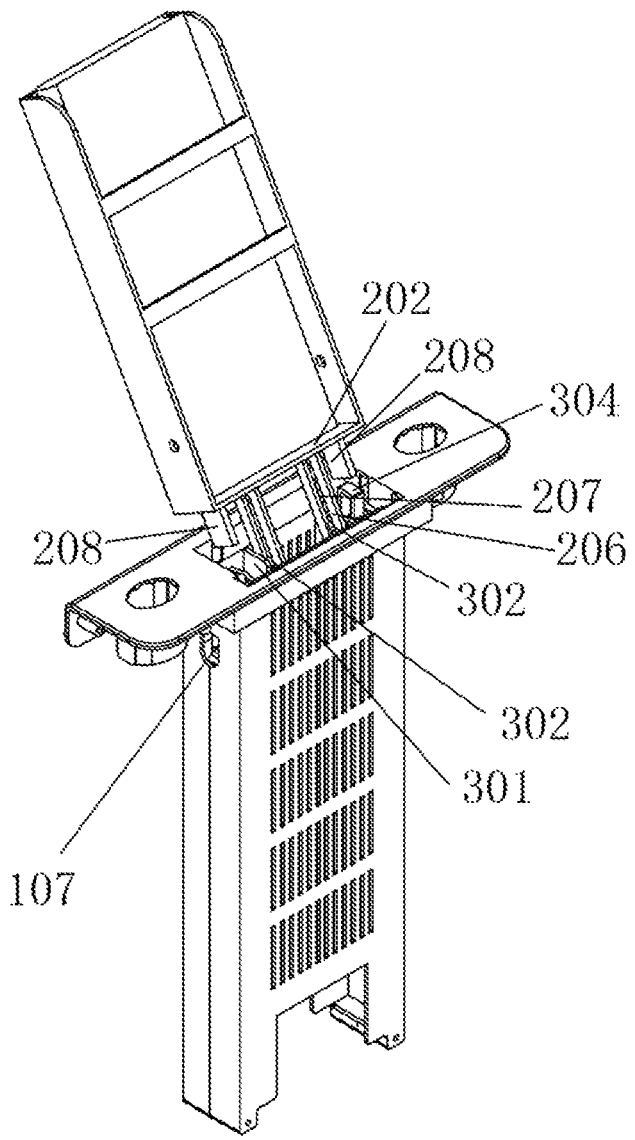
FIG. 4 is a schematic diagram showing the structure of the storage device according to the embodiment of the present disclosure when the inner housing is pulled out from the outer housing and pivoted at a certain degree.
Figure 5:
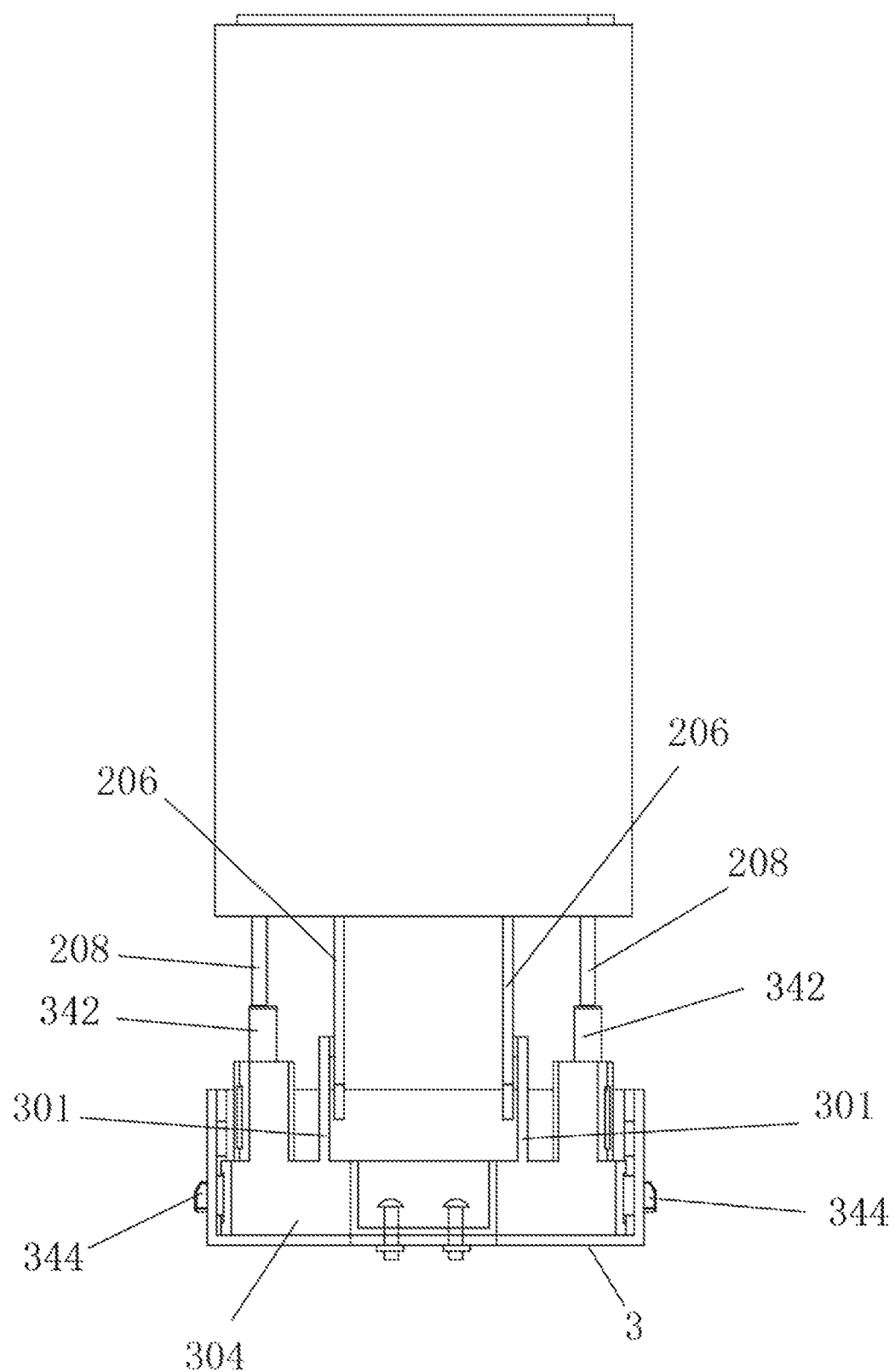
FIG. 5 is a schematic diagram showing a connection between the inner housing and a base according to the embodiment of the present disclosure.
Figure 6:
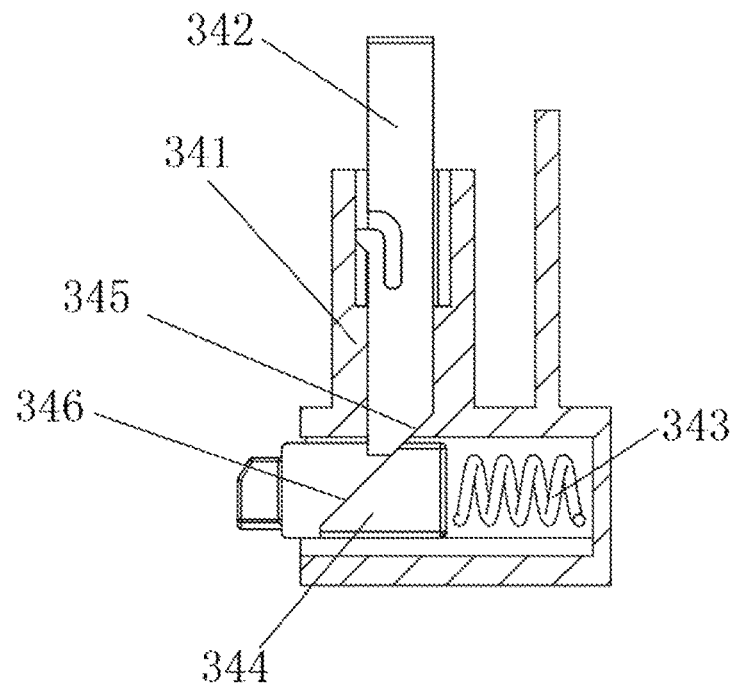
FIG. 6 is a schematic diagram showing a structure of a spring button according to the embodiment of the present disclosure when the inner housing is pulled out from the outer housing.
Figure 7:
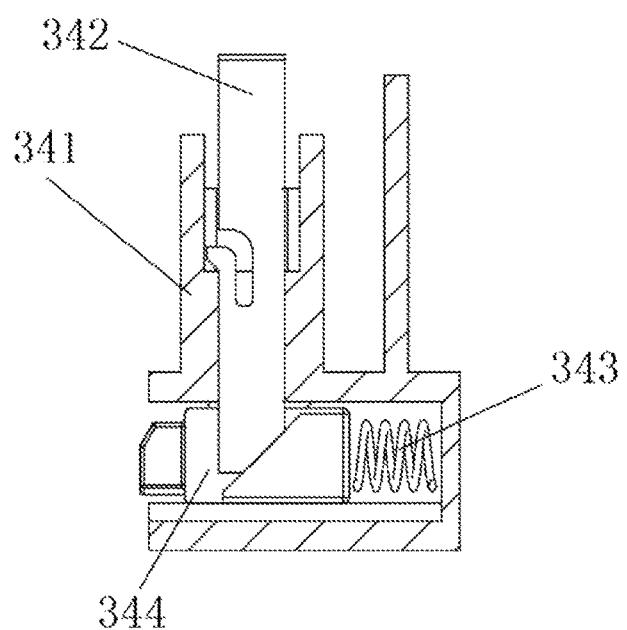
FIG. 7 is a schematic diagram showing the structure of the spring button according to the embodiment of the present disclosure when the inner housing is received in the receiving cavity.

As shown in FIG. 5 to FIG. 7, the base further comprises spring buttons 304. Triggers 208 configured to trigger the spring buttons 304 are provided at the bottom of the transverse base wall 202. In an extended configuration of the inner housing 2 as shown in FIG. 4, the triggers 208 are not in contact with the spring buttons 304. In a retracted configuration of the inner housing 2 as shown in FIG. 1, the triggers 208 are in contact with and abut the spring buttons 304, so that the spring buttons 304 can be pushed by the triggers 208 when the user pushes downward the inner housing 2.

Referring to FIG. 6 to FIG. 7, each of the spring buttons 304 includes a seat 341, a rod 342, a spring 343 and a sliding bar 344. The rod 342, the spring 343 and the sliding bar 344 are arranged inside the seat 341. The rod 342 is configured to be moveable upward or downward along the seat 341. The rod 342 protrudes from the seat 341 and contacts the trigger 208 at an upper end, and has a first inclined surface 345 at a lower end. The sliding bar 344 is arranged transversely below the rod 342. The sliding bar 344 has a second inclined surface 346 matching the first inclined surface 345. The sliding bar 344 is able to protrude transversely from the seat 341 and from the base 3. The sliding bar 344 has one end that can match with the limiting hole 107 and the other end connecting the spring 343. The spring 343 is limited transversely between the sliding bar 344 and the seat 341.

With reference to FIG. 6 as well as FIG. 1 to FIG. 5, the end of the sliding bar 344 that protrudes from the seat 341 can be inserted into the limiting hole 107 when the inner housing 2 is pulled out and slides to a location that the sliding bar 344 aligns with the limiting hole 107. Once the sliding bar 344 is inserted into the limiting hole 107, the base 3 cannot be moved either upward or downward if no force is exerted onto the inner housing 2.

With reference to FIG. 7 as well as FIG. 1 to FIG. 5, the rod 342 can be moved upward or downward along the seat 341. When the inner housing 2 is pushed downward, the trigger 208 of the inner housing 2 pushes the rod 342 to move downward, the first inclined surface 345 is forced to push the second inclined surface 346, so that the sliding bar 344 is forced to slide transversely and retract into the seat 341, and the spring 343 is compressed. The whole sliding bar 344 is moved towards the interior of the seat 341 and the end of the sliding bar 344 disengages from the limiting hole 107. When pushed further, the inner housing 2 will be moved back into the receiving cavity 102.

The storage device according to the present disclosure can be installed into any existing luggage by for example forming an opening in a panel of the luggage, inserting the outer housing 1 into the opening and fastening the fixing plate 106 onto the panel by bolts or other connecting members. A cover in pivot connection to one side of the opening 101 of the outer housing 1 will be preferred. In this way, the traveler can easily take out a portable device from or put it back into the storage device of the luggage.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A storage device, adapted for a portable device and suitable to be installed in luggage, the storage device comprising:
   an inner housing, having a top defining an opening and comprising:
     two vertical side walls, arranged in parallel with each other, and provided with a baffle plate and/or a baffle bar at both front and rear sides; and
     a transverse base wall, connected to bottom ends of the two vertical side walls, wherein the transverse base wall is provided with two connecting legs at a bottom thereof and extending away from the transverse base wall, each of the connecting legs defines a vertical waist-shaped hole;
   an outer housing, having a top opening and defining internally a receiving cavity configured to receive the inner housing; and
   a base, arranged below the transverse base wall, the base comprising two connecting brackets and a connecting pin that is disposed between the connecting brackets;
   wherein, the connecting legs sleeve over the connecting pin through the vertical waist-shaped holes, and two sides of the base are connected to the receiving cavity in a slidable manner.

2. The storage device according to claim 1, wherein:
   the base further comprises a spring button, and the bottom of the transverse base wall is further provided with a trigger configured to trigger the spring button;
   a limiting hole is provided at each side of the receiving cavity in proximity to the top opening of the outer housing; and
   the spring button comprises a position limiting member which matches the limiting hole.

3. The storage device according to claim 2, wherein the position limiting member is a sliding bar, and the spring button further comprises a rod, a spring, and a seat configured to hold the rod, the spring and the sliding bar, wherein the rod is moveable upward and downward along the seat, the rod has a lower end having a first inclined surface, the sliding bar is arranged transversely below the rod and has a second inclined surface matching the first inclined surface, the sliding bar has an end transversely protruding from the seat and from the base and matching the limiting hole, and a further end connected to the spring which is limited transversely between the sliding bar and the seat.

4. The storage device according to claim 3, wherein the rod has an upper end protruding from the seat and is able to be brought into contact with the trigger.

5. The storage device according to claim 1, wherein guide rails are provided at two sides of the receiving cavity, the two sides of the base are provided with sliding blocks matching the guide rails to facilitate sliding connection between the two sides of the base and the receiving cavity.

6. The storage device according to claim 1, wherein at least one heat dissipation hole is provided on at least a side wall of the outer housing.

7. The storage device according to claim 6, wherein a plurality of heat dissipation holes are provided on each of a front side wall and a rear side wall of the outer housing.

8. The storage device according to claim 1, wherein the outer housing has a bottom defining an opening extending into the receiving cavity and configured to allow a wire to pass therethrough.

9. The storage device according to claim 1, wherein a fixing plate is provided around the top opening of the outer housing, and the fixing plate is configured to be fastened onto the luggage.

10. The storage device according to claim 9, wherein a cover is provided at one side of the top opening of the outer housing, and the cover is pivotably connected to the fixing plate.

* * * * *